United States Patent
Droz et al.

(10) Patent No.: US 10,942,272 B2
(45) Date of Patent: Mar. 9, 2021

(54) POWER MODULATION FOR A ROTARY LIGHT DETECTION AND RANGING (LIDAR) DEVICE

(71) Applicant: Waymo LLC, Mountain View, CA (US)

(72) Inventors: Pierre-Yves Droz, Los Altos, CA (US); Bernard Fidric, Cupertino, CA (US)

(73) Assignee: Waymo LLC, Mountain View, CA (US)

( * ) Notice: Subject to any disclaimer, the term of this patent is extended or adjusted under 35 U.S.C. 154(b) by 1098 days.

(21) Appl. No.: 15/377,951

(22) Filed: Dec. 13, 2016

(65) Prior Publication Data
US 2018/0164439 A1    Jun. 14, 2018

(51) Int. Cl.
*G01C 3/08* (2006.01)
*G01S 17/26* (2020.01)
(Continued)

(52) U.S. Cl.
CPC ............ *G01S 17/26* (2020.01); *G01S 7/4817* (2013.01); *G01S 17/42* (2013.01); *G01S 17/89* (2013.01);
(Continued)

(58) Field of Classification Search
CPC ........ G01S 17/26; G01S 17/931; G01S 17/42; G01S 17/89; G01S 7/4817; G01S 17/86; G01S 7/4814; G01S 7/4816; G01S 7/4813
See application file for complete search history.

(56) References Cited

U.S. PATENT DOCUMENTS 7,787,134 B2 * 8/2010 Kohnen ................. G01B 11/14
356/3.1
8,767,190 B2    7/2014 Hall
(Continued)

FOREIGN PATENT DOCUMENTS

JP    2006-500598 A    1/2006
JP    2012-174006 A    9/2012
(Continued)

OTHER PUBLICATIONS

International Search Report and Written Opinion for PCT/US2017/066043 dated Mar. 29, 2018.

*Primary Examiner* — Samantha K Abraham
(74) *Attorney, Agent, or Firm* — McDonnell Boehnen Hulbert & Berghoff LLP

(57) ABSTRACT

An example method involves rotating a sensor that emits light pulses and detects reflections of the emitted light pulses based on a pointing direction of the sensor. The method also involves identifying a range of pointing directions of the sensor that are associated with a target region of an environment. The method also involves determining whether a current pointing direction of the sensor is within the identified range. The method also involves modulating the emitted light pulses according to a first modulation scheme in response to a determination that the current pointing direction is within the identified range. The method also involves modulating the emitted light pulses according to a second modulation scheme in response to a determination that the current pointing direction is outside the identified range. The second modulation scheme is different than the first modulation scheme.

20 Claims, 7 Drawing Sheets

(51) Int. Cl.
  *G01S 17/89* (2020.01)
  *G01S 7/481* (2006.01)
  *G01S 17/42* (2006.01)
  *G01S 17/931* (2020.01)
  *G01S 17/86* (2020.01)

(52) U.S. Cl.
  CPC ........... G01S 17/931 (2020.01); *G01S 7/4813* (2013.01); *G01S 7/4814* (2013.01); *G01S 7/4816* (2013.01); *G01S 17/86* (2020.01)

(56) References Cited

U.S. PATENT DOCUMENTS

| | | | |
|---|---|---|---|
| 9,091,535 | B2 | 7/2015 | Baeg et al. |
| 9,383,753 | B1 * | 7/2016 | Templeton ............... G01S 17/86 |
| 9,470,520 | B2 | 10/2016 | Shwarz et al. |
| 2006/0132752 | A1 | 6/2006 | Kane |
| 2006/0145062 | A1 | 7/2006 | Boehlau et al. |
| 2012/0038903 | A1 * | 2/2012 | Weimer ................. G01S 7/4868 356/4.07 |
| 2013/0044309 | A1 | 2/2013 | Dakin et al. |
| 2013/0325243 | A1 | 12/2013 | Lipkowski et al. |
| 2014/0233942 | A1 * | 8/2014 | Kanter .................... G01S 17/26 398/25 |
| 2015/0091374 | A1 | 4/2015 | Lenius et al. |
| 2015/0185313 | A1 | 7/2015 | Zhu |
| 2016/0084651 | A1 * | 3/2016 | Hinderling ............ G01S 7/4817 356/4.01 |
| 2016/0223654 | A1 | 8/2016 | Sparbert et al. |
| 2016/0274589 | A1 | 9/2016 | Templeton et al. |
| 2016/0291134 | A1 | 10/2016 | Droz et al. |
| 2018/0254607 | A1 | 9/2018 | Kitano et al. |

FOREIGN PATENT DOCUMENTS

| | | |
|---|---|---|
| JP | 2016-57141 A | 4/2016 |
| JP | 2016-090268 A | 5/2016 |
| WO | 2016033036 A2 | 3/2016 |
| WO | 2017/060965 A1 | 4/2017 |

\* cited by examiner

POWER MODULATION FOR A ROTARY LIGHT DETECTION AND RANGING (LIDAR) DEVICE

BACKGROUND

A vehicle can include one or more sensors that are configured to detect information about the environment in which the vehicle operates. One such sensor is a light detection and ranging (LIDAR) device.

A LIDAR device can determine distances to environmental features while scanning through a scene to assemble a "point cloud" indicative of reflective surfaces in the environment. Individual points in the point cloud can be determined, for example, by transmitting a laser pulse and detecting a returning pulse, if any, reflected from an object in the environment, and then determining a distance to the object according to a time delay between the transmission of the pulse and the reception of the reflected pulse. As a result, for example, a three-dimensional map of points indicative of locations of reflective features in the environment can be generated.

SUMMARY

In one example, a method involves rotating a sensor that emits light pulses and detects reflections of the emitted light pulses based on a pointing direction of the sensor. Rotating the sensor may change the pointing direction of the sensor such that the sensor scans a region of an environment from which the emitted light pulses are reflected. The method also involves identifying a range of pointing directions of the sensor that are associated with a target region of the environment. The method also involves determining whether a current pointing direction of the sensor is within the identified range. The method also involves modulating the emitted light pulses according to a first modulation scheme in response to a determination that the current pointing direction is within the identified range. The method also involves modulating the emitted light pulses according to a second modulation scheme in response to a determination that the current pointing direction is outside the identified range.

In another example, a vehicle includes a sensor that emits light pulses and detects reflections of the emitted light pulses based on a pointing direction of the sensor. The vehicle also includes an actuator that rotates the sensor. Rotating the sensor may change the pointing direction of the sensor such that the sensor scans a region of an environment from which the emitted light pulses are reflected. The vehicle also includes one or more processors and data storage storing instructions that, when executed by the one or more processors, cause the vehicle to perform operations. The operations comprise identifying a range of pointing directions of the sensor that are associated with a target region of the environment. The operations also comprise determining whether a current pointing direction of the sensor is within the identified range. The operations also comprise modulating the emitted light pulses according to a first modulation scheme in response to a determination that the current pointing direction is within the identified range. The operations also comprise modulating the emitted light pulses according to a second modulation scheme in response to a determination that the current pointing direction is outside the identified range.

In yet another example, a light detection and ranging (LIDAR) device comprises a rotating platform, a LIDAR transmitter, a LIDAR receiver, and a controller. The rotating platform rotates to change a pointing direction of the LIDAR device. The LIDAR transmitter emits light pulses in the pointing direction of the LIDAR device. The LIDAR receiver receives reflections of the emitted light pulses such that the LIDAR device scans a region of an environment from which the emitted light pulses are reflected. The LIDAR transmitter and the LIDAR receiver are mounted to the rotating platform. The controller receives an indication of a range of pointing directions of the LIDAR device that are associated with a target region of the environment. The controller also determines whether a current pointing direction of the LIDAR device is within the range of pointing directions. The controller also modulates the emitted light pulses according to a first modulation scheme in response to a determination that the current pointing direction is within the range of pointing directions. The controller also modulates the emitted light pulses according to a second modulation scheme in response to a determination that the current pointing direction is outside the range of pointing directions.

In still another example, a system comprises means for rotating a sensor that emits light pulses and detects reflections of the emitted light pulses based on a pointing direction of the sensor. Rotating the sensor may change the pointing direction of the sensor such that the sensor scans a region of an environment from which the emitted light pulses are reflected. The system also comprises means for identifying a range of pointing directions of the sensor that are associated with a target region of the environment. The system also comprises means for determining whether a current pointing direction of the sensor is within the identified range. The system also comprises means for modulating the emitted light pulses according to a first modulation scheme in response to a determination that the current pointing direction is within the identified range. The system also comprises means for modulating the emitted light pulses according to a second modulation scheme in response to a determination that the current pointing direction is outside the identified range.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
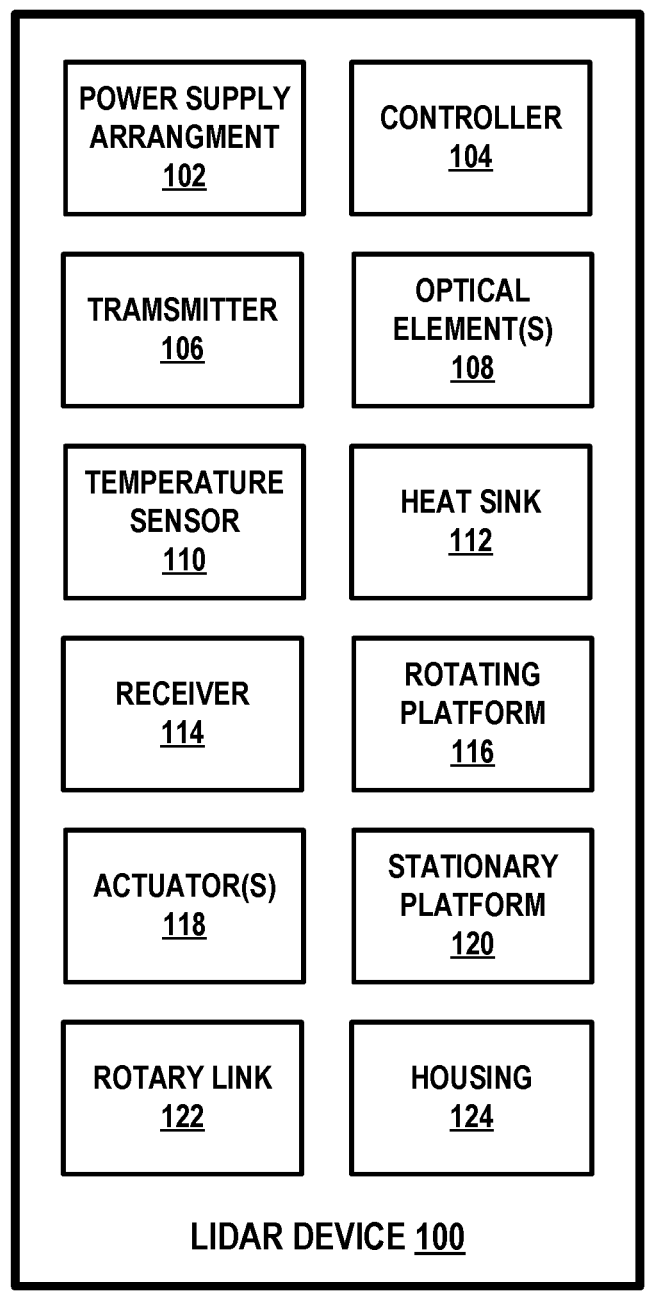
FIG. 1 is a simplified block diagram of a LIDAR device, according to an example embodiment.

Exemplary implementations are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations.

I. OVERVIEW

There are continued efforts to improve vehicle safety and/or autonomous operation, including the development of vehicles equipped with accident-avoidance systems and remote sensing capabilities. Various sensors, such as a LIDAR device, may be included in a vehicle to detect obstacles or objects in an environment of the vehicle and thereby facilitate accident avoidance and/or autonomous operation, among other options. In some instances, a LIDAR device configuration may be less suitable for some object detection/identification scenarios than other scenarios.

In one instance, a LIDAR device that is scanning a wide field-of-view (FOV) for a scanning duration may provide a lower angular resolution 3D map of the environment than a similar LIDAR device that is scanning a narrower FOV over the same scanning duration. The lower resolution, for example, may be sufficient for identifying medium range objects (e.g., within a threshold distance to the vehicle) and/or larger objects (e.g., other vehicles), but may be insufficient to identify long range objects (e.g., outside the threshold distance) and/or smaller objects (e.g., pedestrians, animals, etc.). Further, adjusting the scanning duration may affect a refresh rate of the LIDAR device (i.e., rate at which the LIDAR device repeatedly scans the entire FOV). On one hand, a high refresh rate may allow the LIDAR device to quickly detect changes in the FOV (e.g., moving objects, etc.). On the other hand, a low refresh rate may allow the LIDAR device to provide higher resolution data.

In another instance, a LIDAR device that scans a wide FOV at a high scanning range (e.g., by transmitting high intensity light), a high refresh rate, and/or a high resolution may generate a large amount of heat that can affect the accuracy, reliability, safety, and/or other characteristic of the LIDAR device (and/or a component thereof). For example, the LIDAR device may include a fiber laser that amplifies the emitted light pulses, optical elements (e.g., mirror, lens, etc.) that condition or direct the emitted light pulses toward a surrounding environment, as well as one or more other components. The fiber laser may generate heat and/or the emitted light pulses may transfer heat energy to components along a propagation path of the emitted light pulses. For instance, one or more components of the LIDAR device may be temperature-sensitive or may otherwise be affected by the generated heat (e.g., a mirror may degrade due to heat associated with high intensity light pulses incident on the mirror over a short period of time, etc.).

To help resolve such challenges, disclosed herein are example implementations that involve scanning different regions of the environment respectively with different resolutions, scanning ranges, refresh rates, and/or other sensor configurations. Specifically, in some scenarios, it may be desirable for a LIDAR sensor to scan certain regions of a surrounding environment with a higher scanning resolution, scanning range, refresh rate, etc., while scanning other regions of the environment with a lower resolution, range, refresh rate etc. For instance, in a scenario where a vehicle equipped with a LIDAR sensor is travelling along a road, regions of the environment along the road or adjacent to the road may include objects relevant to navigation of the vehicle (e.g., other vehicles, obstacles, etc.). Further, other regions of the environment could be less relevant to the navigation of the vehicle (e.g., nearby buildings, etc.). As such, example implementations herein may involve selectively modulating power provided to a LIDAR sensor, thereby improving LIDAR sensor reliability, effectiveness, energy efficiency, among other factors.

In line with the discussion above, one example method may involve rotating a sensor to change a pointing direction of the sensor, thereby allowing the sensor to scan a surrounding environment. For example, the sensor can be mounted on a rotating platform that rotates at a given rate (e.g., 15 Hz, etc.). As the sensor rotates, the sensor may emit light pulses (or other type of signal) periodically, intermittently, and/or continuously.

The method may also involve identifying a range of pointing directions of the sensor that are associated with a target region of the environment. The method may also involve determining a current pointing direction of the sensor. The method may then involve modulating the emitted light pulses from the sensor according to: (i) a first modulation scheme if the current pointing direction is within the identified range; or (ii) a second (different) modulation scheme if the current pointing direction is outside the identified range.

By way of example, consider a scenario where a vehicle that mounts the sensor detects a pedestrian near an upcoming street intersection. The vehicle could then decide to track the pedestrian using a high scanning refresh rate (e.g., 15 Hz, etc.) and a high scanning resolution until the vehicle crosses the intersection safely (e.g., to avoid a potential collision with the pedestrian if the pedestrian begins moving into the intersection). In turn, the vehicle could identify a range of pointing directions of the sensor where the FOV of the sensor overlaps a target region of the environment where the pedestrian may be located. As the sensor rotates, when a current pointing direction of the sensor is within the identified range, the vehicle may operate the sensor to emit light pulses having a sufficient power to achieve a scanning range or distance to where the pedestrian is located, and with a sufficient pulse rate to achieve the high scanning resolution. Further, where the rate of rotation of the sensor is 15 Hz, the vehicle may cause the sensor to emit a respective light pulse in the current pointing direction after each complete rotation of the sensor back to the current pointing direction, thereby achieving the target scanning refresh rate of 15 Hz.

Continuing with this scenario, the vehicle could also operate the sensor at a reduced power level, pulse rate, refresh rate, etc., when the sensor is rotated to another pointing direction outside the identified range of pointing directions. For example, at the other pointing direction, the FOV of the sensor might not overlap with the location of the pedestrian. Thus, by operating the sensor with the reduced characteristics, the vehicle can reduce the overall power consumption of the sensor when scanning regions of the surrounding environment that are less critical to a navigational operation of the vehicle.

Other scenarios are possible as well. Further, when selecting a modulation scheme, an example implementation may take into account other factors, such as temperature measurements (e.g., temperature of an optical element along a propagation path of the emitted light pulses, temperature of a heatsink coupled to the sensor, etc.), and/or an amount of energy provided to the sensor over time, among other factors.

II. EXAMPLE SENSORS

Although example sensors described herein include LIDAR sensors, other types of sensors are possible as well. A non-exhaustive list of example sensors that can be employed herein includes radio detection and ranging (RADAR) sensors, sound navigation and ranging (SONAR) sensors, among others. To that end, some example sensors herein may include an active range sensor that emits a signal (e.g., in the form of a sequence of pulses, etc.) based on modulated power provided to the sensor, and then detects reflections of the emitted signal from objects in the surrounding environment.

FIG. 1 is a simplified block diagram of a LIDAR device 100, according to an example embodiment. As shown, LIDAR device 100 includes a power supply arrangement 102, a controller 104, a transmitter 106, one or more optical elements 108, a temperature sensor 110, a heat sink 112, a receiver 114, a rotating platform 116, one or more actuators 118, a stationary platform 120, a rotary link 122, and a housing 124. In other embodiments, LIDAR device 100 may include more, fewer, or different components. Additionally, the components shown may be combined or divided in any number of ways.

Power supply arrangement 102 may be configured to supply, receive, and/or distribute power to various components of LIDAR device 100. To that end, power supply arrangement 102 may include or otherwise take the form of a power source (e.g., battery cells, etc.) disposed within LIDAR device 100 and connected to various components of the LIDAR device 100 in any feasible manner, so as to supply power to those components. Additionally or alternatively, power supply arrangement 102 may include or otherwise take the form of a power adapter configured to receive power from one or more external power sources (e.g., from a power source arranged in a vehicle to which LIDAR device 100 is mounted) and to transmit the received power to various components of LIDAR device 100.

Controller 104 may include one or more electronic components and/or systems arranged to facilitate certain operations of LIDAR device 100. Controller 104 may be disposed within LIDAR device 100 in any feasible manner. For instance, controller 104 may be disposed, at least partially, within a central cavity region of rotary link 122.

In some examples, controller 104 may include or otherwise be coupled to wiring used for transfer of control signals to various components of LIDAR device 100 and/or for transfer of data from various components of LIDAR device 100 to controller 104. Generally, the data that controller 104 receives may include sensor data based on detections of light by receiver 114, among other possibilities. Moreover, the control signals sent by controller 104 may operate various components of LIDAR device 100, such as by controlling emission of light by transmitter 106, controlling detection of light by the receiver 114, and/or controlling actuator(s) 118 to rotate rotating platform 116, among other possibilities.

To that end, controller 104 may include one or more processors, data storage, and program instructions (stored on the data storage) executable by the one or more processors to cause LIDAR device 100 to perform the various operations described herein. Additionally or alternatively, the controller may communicate with an external controller or the like (e.g., a computing system arranged in a vehicle to which LIDAR device 100 is mounted) so as to help facilitate transfer of control signals and/or data between the external controller and the various components of LIDAR device 100. Additionally or alternatively, controller 104 may include circuitry wired to perform the various functions described herein.

Transmitter 106 may be configured to transmit light (or other signal) toward an environment of LIDAR device 100. For example, transmitter 106 may include one or more light sources to emit, respectively, a plurality of light beams and/or pulses having wavelengths within a wavelength range. The wavelength range could, for example, be in the ultraviolet, visible, and/or infrared portions of the electromagnetic spectrum. In some examples, the wavelength range can be a narrow wavelength range, such as provided by lasers. In one example, the wavelength range includes wavelengths that are approximately between 1525 nm and 1565 nm. It is noted that this range is described for exemplary purposes only and is not meant to be limiting.

In some implementations, the light source(s) in transmitter 106 may include a fiber laser coupled to an optical amplifier. In particular, the fiber laser may be a laser in which an active gain medium (i.e., source of optical gain within laser) is in an optical fiber. Moreover, the fiber laser could be arranged in various ways within LIDAR device 100. For instance, the fiber laser could be disposed between rotating platform 116 and receiver 114.

As such, the present disclosure will be generally described herein in the context of a fiber laser being used as a light source in transmitter 106. In some arrangements however, one or more light sources in transmitter 106 may additionally or alternatively include laser diodes, light emitting diodes (LED), vertical cavity surface emitting lasers (VCSEL), organic light emitting diodes (OLED), polymer light emitting diodes (PLED), light emitting polymers (LEP), liquid crystal displays (LCD), microelectromechanical systems (MEMS), and/or any other device configured to selectively transmit, reflect, and/or emit light to provide a plurality of emitted light beams and/or pulses.

Optical element(s) 108 can be included in or otherwise coupled to transmitter 106 and/or receiver 114. For example, optical element(s) 108 can be arranged to direct light from a light source in transmitter 106 toward the environment. As such, optical element(s) may include any feasible combination of mirror(s) used to guide propagation of light through physical space and/or lens(es) used to adjust certain characteristics of the light, among other optical components. For instance, optical element(s) 108 may include a transmit lens arranged to collimate the light from light source(s) in transmitter 106, thereby resulting in light having rays that are substantially parallel to one another.

In some implementations, optical element(s) 108 may also include a diffuser arranged to spread the light along a vertical axis. In practice, the diffuser may be formed from glass or another material, and may be shaped (e.g., aspherical shape) to spread or otherwise scatter light in a particular manner. In one embodiment, the vertical spread may be a spread of +7° away from a horizontal axis to −18° away from the horizontal axis (e.g., the horizontal axis ideally being parallel to a ground surface in the environment). Moreover, the diffuser may be coupled to a light source in transmitter 106 in any direct or indirect manner, such as by being fused to an output end of a fiber laser for instance.

Thus, this implementation may result in laser beams or the like having a horizontal beam width (e.g., 1 mm) that is significantly narrower than a vertical beam width of the laser beams. Such horizontally-narrow laser beams, for instance, may help avoid interference between beams reflected off a reflective object and beams reflected off a less-reflective object that is horizontally adjacent to the reflective object, which may ultimately help LIDAR device 100 distinguish between those objects. Other advantages are also possible.

Temperature sensor 110 may include one or more temperature sensors (e.g., thermistor, thermopile, etc.) arranged to measure a temperature associated with emitted light pulses from transmitter 106. In some implementations, optical element(s) 108 may also include a dichroic mirror arranged to reflect at least a portion of diffused light towards temperature sensor 110. With this implementation, temperature sensor 110 could be arranged to measure energy of the light being emitted towards the environment. Data related to that temperature measurement could be received by controller 104, and then used by controller 104 as basis for facilitating further operations, such as adjustments to intensity of the emitted light for example. In another implementation, temperature sensor 110 can be arranged to measure a temperature of another component of LIDAR device 100, such as a temperature of heat sink 112 for instance. Other implementations are also possible.

Heat sink 112 may include any heat conductor (e.g., aluminum, copper, other metal or metal compound) arranged to conduct heat away from transmitter 106. For example, where transmitter 106 includes a fiber laser light source, the fiber laser may generate heat as a result of amplifying the intensity of light via an optical amplifier. The generated heat may affect operation of various components in LIDAR device 100 (e.g., circuitry, transmitter 106, etc.). As such, heat sink 112 may absorb and/or distribute the generated heat to mitigate the effect of the generated heat on the various components of LIDAR device 100.

Receiver 114 may include one or more photodetectors (e.g., photodiodes, avalanche photodiodes, etc.) that are arranged to intercept and detect reflections of the light pulses emitted by transmitter 106 and reflected from one or more objects in a surrounding environment of LIDAR device 100. To that end, receiver 114 may be configured to detect light having wavelengths in the same wavelength range as the light emitted by transmitter 106 (e.g., 1525 nm to 1565 nm). In this way, LIDAR device 100 may distinguish reflected light pulses originated by LIDAR device 100 from other light in the environment.

In some examples, LIDAR device 100 can select or adjust a vertical scanning resolution thereof by focusing incoming light within a vertical angular range onto a particular receiver. As the vertical FOV increases, for instance, the vertical scanning resolution may decrease. As a specific example, receiver 114 could be arranged to focus incoming light within a vertical FOV of +7° away from a horizontal axis of LIDAR device 100 to −7° away from the horizontal axis. With this arrangement, for example, a vertical scanning resolution of LIDAR device 100 may correspond to 0.067°. The vertical angular scanning resolution can be adjusted by focusing (e.g., via actuating a lens of optical element(s) 108, etc.) a different vertical FOV of the incoming light onto receiver 114. For example, if receiver 114 receives light focused from a vertical FOV from +7° to 0° relative to the horizontal axis (as opposed to a range of +7° to −7°), then the vertical resolution of receiver 114 can be improved from 0.067° to 0.034°.

Additionally or alternatively, in some examples, LIDAR device 100 can select or adjust a horizontal scanning resolution by changing a rate of rotation of LIDAR device 100 and/or adjusting a pulse rate of light pulses emitted by transmitter 106. As a specific example, transmitter 106 can be configured to emit light pulses at a pulse rate of 150,000 light pulses per second. In this example, LIDAR device 100 may be configured to rotate at 15 Hz (i.e., 15 complete 360° rotations per second). As such, receiver 114 can detect light with a 0.036° horizontal angular resolution. The horizontal angular resolution of 0.036° can be adjusted by changing the rate of rotation of LIDAR device 100 or by adjusting the pulse rate. For instance, if LIDAR device 100 is instead rotated at 30 Hz, the horizontal angular resolution may become 0.072°. Alternatively, if transmitter 106 emits the light pulses at a rate of 300,000 light pulses per second while maintaining the rate of rotation of 15 Hz, then the horizontal angular resolution may become 0.018°.

In some examples, receiver 114 may include multiple receivers configured to detect light with different resolutions simultaneously. For example, a first receiver may be configured to detect light with a first resolution and a second receiver may be configured to detect light with a second resolution that is lower than the first resolution. As a specific example, the first receiver could be arranged to receive incoming light within a vertical FOV of +7° away from a horizontal axis of LIDAR device 100 to −7° away from the horizontal axis, and the second receiver could be arranged to receive incoming light within a vertical FOV of −7° to −18°. In this way, the first and second receivers collectively allow for detection of light along a FOV of +7° to −18°, but at different respective vertical resolutions. Continuing with the example above, the first receiver may be configured to detect light with a 0.036° (horizontal)×0.067° (vertical) angular resolution, and the second receiver 112 may be configured to detect light with a 0.036° (horizontal)×0.23° (vertical) angular resolution. Thus, in some examples, the first and second receivers may each have a respective optical arrangement (e.g., optical element(s) 108) that allows the respective receivers to provide the respective resolution and receive the respective FOV as described above. It is noted that these resolutions and FOVs are for exemplary purposes only and are not meant to be limiting.

In one embodiment, receiver 114 may be coupled an optical lens of optical elements 108 that is arranged to focus light reflected from one or more objects in the environment of the LIDAR device 100 onto detectors of receiver 114. In this embodiment, the optical lens may have dimensions of approximately 10 cm×5 cm as well as a focal length of approximately 35 cm. Moreover, in some instances, the optical lens may be shaped so as to focus incoming light along a particular vertical FOV as described above (e.g., +7° to −7°). As such, the optical lens (e.g., included in optical element(s) 108) may take on one of various forms (e.g., spherical shaping) without departing from the scope of the present disclosure.

In some implementations, optical elements 108 may also include at least one mirror arranged to fold the optical path between the at least one optical lens and a photodetector array in receiver 114. Each such mirror may be fixed within receiver 114 in any feasible manner. Also, any feasible number of mirrors may be arranged for purposes of folding the optical path. For instance, receiver 114 may also include two or more mirrors arranged to fold the optical path two or more times between the optical lens and the photodetector array. In practice, such folding of the optical path may help reduce the size of the first receiver, among other outcomes.

Furthermore, as noted, receiver 114 may include a photodetector array, which may include two or more detectors each configured to convert detected light (e.g., in the above-mentioned wavelength range) into an electrical signal indicative of the detected light. In practice, such a photodetector array could be arranged in one of various ways. For example, the detectors can be disposed on one or more substrates (e.g., printed circuit boards (PCBs), flexible PCBs, etc.) and arranged to detect incoming light that is traveling along the optical path from the optical lens. Also, such a photodetector array could include any feasible number of detectors aligned in any feasible manner. For example, the photodetector array may include a 13×16 array of detectors. It is noted that this photodetector array is described for exemplary purposes only and is not meant to be limiting.

Additionally, the detectors of in the array may take various forms. For example, the detectors may take the form of photodiodes, avalanche photodiodes (e.g., Geiger mode and/or linear mode avalanche photodiodes), phototransistors, cameras, active pixel sensors (APS), charge coupled devices (CCD), cryogenic detectors, and/or any other sensor of light configured to receive focused light having wavelengths in the wavelength range of the emitted light. Other examples are possible as well.

Rotating platform 116 may be configured to rotate about an axis. To that end, rotating platform 116 can be formed from any solid material suitable for supporting one or more components mounted thereon. For example, transmitter 106 and receiver 114 may be arranged on rotating platform 116 such that each of these components moves relative to the environment based on rotation of rotating platform 116. In particular, each of these components could be rotated relative to an axis so that LIDAR device 100 may obtain information from various directions. In this manner, a pointing direction of LIDAR device 100 can be adjusted horizontally by actuating the rotating platform 114 to different directions.

In order to rotate platform 116 in this manner, one or more actuators 118 may actuate the rotating platform 114. To that end, actuators 118 may include motors, pneumatic actuators, hydraulic pistons, and/or piezoelectric actuators, among other possibilities.

With this arrangement, controller 104 could operate actuator 118 to rotate rotating platform 116 in various ways so as to obtain information about the environment. In one example, rotating platform 116 could be rotated in either direction. In another example, rotating platform 116 may carry out full revolutions such that LIDAR device 100 provides a 360° horizontal FOV of the environment. Moreover, rotating platform 116 could rotate at various rates so as to cause LIDAR device 100 to scan the environment at various refresh rates. For example, LIDAR device 100 may be configured to have a refresh rate of 15 Hz (e.g., fifteen complete rotations of the LIDAR device 100 per second).

Stationary platform 120 may take on any shape or form and may be configured for coupling to various structures, such as to a top of a vehicle for example. Also, the coupling of the stationary platform may be carried out via any feasible connector arrangement (e.g., bolts and/or screws). In this way, LIDAR device 100 could be coupled to a structure so as to be used for various purposes, such as those described herein.

Rotary link 122 directly or indirectly couples stationary platform 120 to the rotating platform 116. To that end, rotary link 122 may take on any shape, form and material that provides for rotation of rotating platform 116 about an axis relative to the stationary platform 120. For instance, rotary link 122 may take the form of a shaft or the like that rotates based on actuation from actuator 118, thereby transferring mechanical forces from actuator 118 to rotating platform 116. In one implementation, rotary link 122 may have a central cavity in which one or more components of LIDAR device 100 may be disposed.

Housing 124 may take on any shape, form, and material and may be configured to house one or more components of LIDAR device 100. For example, housing 124 can be a dome-shaped housing. Further, for example, housing 124 may be composed of a material that is at least partially non-transparent, which may allow for blocking of at least some light from entering the interior space of the housing 124 and thus help mitigate thermal and noise effects of ambient light on one or more components of LIDAR device 100. It is noted that this housing is for exemplary purposes only and is not meant to be limiting.

In some examples, housing 124 may be coupled to rotating platform 116 such that housing 122 is configured to rotate about the above-mentioned axis based on rotation of rotating platform 116. With this implementation, transmitter 106, receiver 114, and possibly other components of LIDAR device 100 may each be disposed within housing 124. In this manner, transmitter 106 and receiver 114 may rotate along with housing 124 while being disposed within housing 124. It is noted that this arrangement of LIDAR device 100 is described for exemplary purposes only and is not meant to be limiting.

Figure 2A:
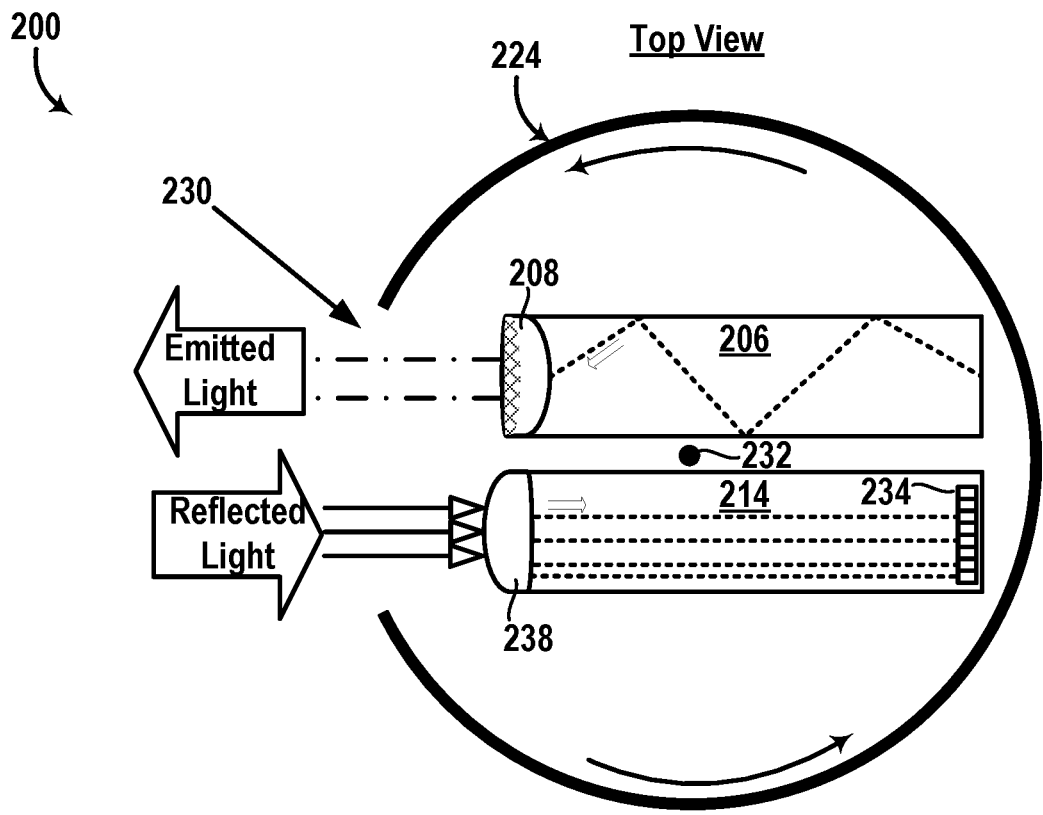
FIG. 2A is a cross-sectional illustration of a top view of a LIDAR device, according to an example embodiment.
Figure 2B:
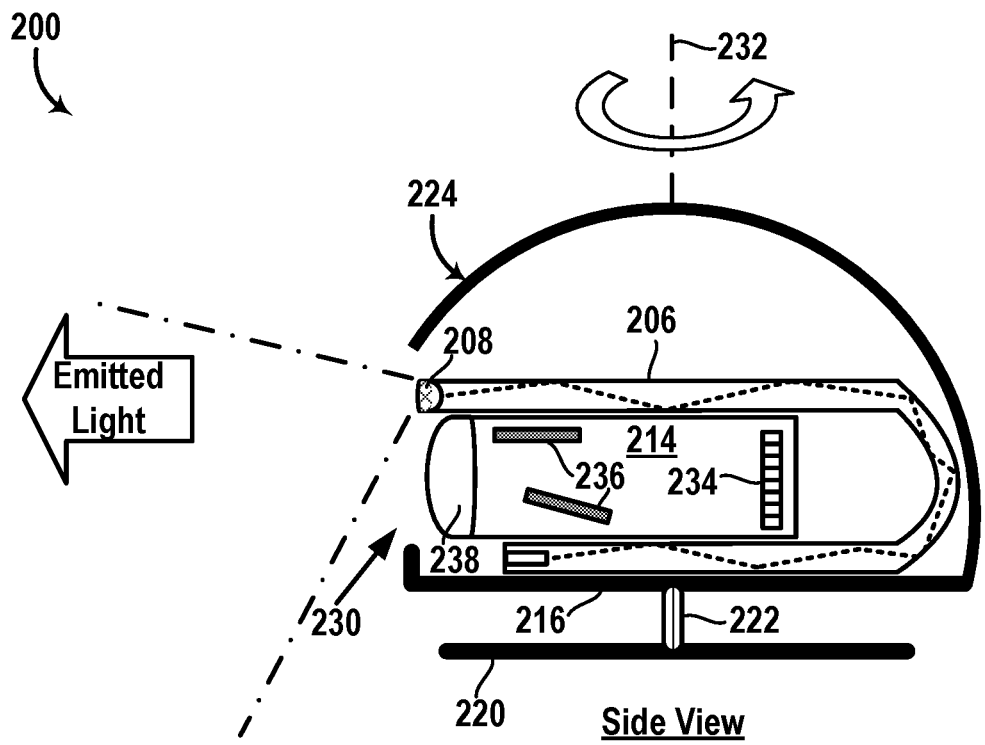
FIG. 2B is a cross-sectional illustration of a side view of a LIDAR device, according to an example embodiment.

FIGS. 2A and 2B next show an example set of illustrations of a LIDAR device 200 having the features disclosed herein. In particular, FIG. 2A shows a top cross-sectional view of LIDAR device 200, and FIG. 2B shows a side cross-sectional view of LIDAR device 200. It is noted that these illustrations are shown for exemplary purposes only and are not meant to be limiting.

More specifically, FIGS. 2A and 2B collectively illustrate that LIDAR device 200 includes a housing 224 that is coupled to a rotating platform 216 that may be similar, respectively, to housing 124 and platform 116. Rotating platform 216 is then shown as being coupled to a stationary platform 220 via a rotary link 222, which may be similar, respectively, to stationary platform 120 and rotary link 122. With this arrangement, rotating platform 216 could rotate about axis 232, thereby also causing rotation of a transmitter 206 and a receiver 214, which may be similar, respectively, to transmitter 106 and receiver 114.

As shown, housing 224 also includes an aperture 230 through which light may be emitted into an environment and through which reflected light may be received from the environment. Further, FIGS. 2A and 2B collectively illustrate that transmitter 206 and receiver 214 are disposed within housing 224.

As shown, transmitter 206 includes an optical lens 208 (e.g., a diffuser), which may be similar to at least one of optical elements 108 for instance, fused with a fiber laser that acts as an optical amplifier, the fiber laser being at least partially positioned between rotating platform 216 and receiver 214. In one example, optical lens 208 may be arranged to vertically spread the emitted light along a vertical FOV of +7° to −18°.

Further, as shown, receiver 214 includes an optical arrangement (e.g., one or more of optical elements 108) that provides an optical path between an optical lens 238 and a photodetector array 234. Specifically, the optical arrangement is shown to include two mirrors 236 arranged to fold the optical path twice between optical lens 238 and photodetector array 236, thereby helping reduce the size of receiver 214.

Although not shown, transmitter 206 may also include one or more mirrors along a propagation path (shown as dotted lines in FIG. 2B) of the emitted light generated by the fiber laser or other light source of transmitter 206. For example, a dichroic mirror can be placed inside transmitter 106 to allow a portion of the light to propagate towards a temperature sensor (not shown), such as temperature sensor 110 for instance. To that end, the temperature sensor may provide a temperature measurement indicative of an amount of energy transmitted toward lens 208 and toward the environment via the emitted light.

III. EXAMPLE VEHICLES

Some example implementations herein involve a sensor, such as LIDAR devices 100 and 200 for instance, mounted to a vehicle. However, an example sensor disclosed herein can also be used for various other purposes and may be incorporated on or otherwise connected to any feasible system or arrangement. For example, an example LIDAR device can be used in an assembly line setting to monitor objects (e.g., products) being manufactured in the assembly line. Other examples are possible as well. Additionally, although illustrative embodiments herein include a LIDAR device mounted on a car, an example LIDAR device may additionally or alternatively be used on any type of vehicle, including conventional automobiles as well as automobiles having an autonomous or semi-autonomous mode of operation. Further, the term "vehicle" is to be broadly construed to cover any moving object, including, for instance, a truck, a van, a semi-trailer truck, a motorcycle, a golf cart, an off-road vehicle, a warehouse transport vehicle, or a farm vehicle, as well as a carrier that rides on a track such as a rollercoaster, trolley, tram, or train car, etc.

Figure 3:
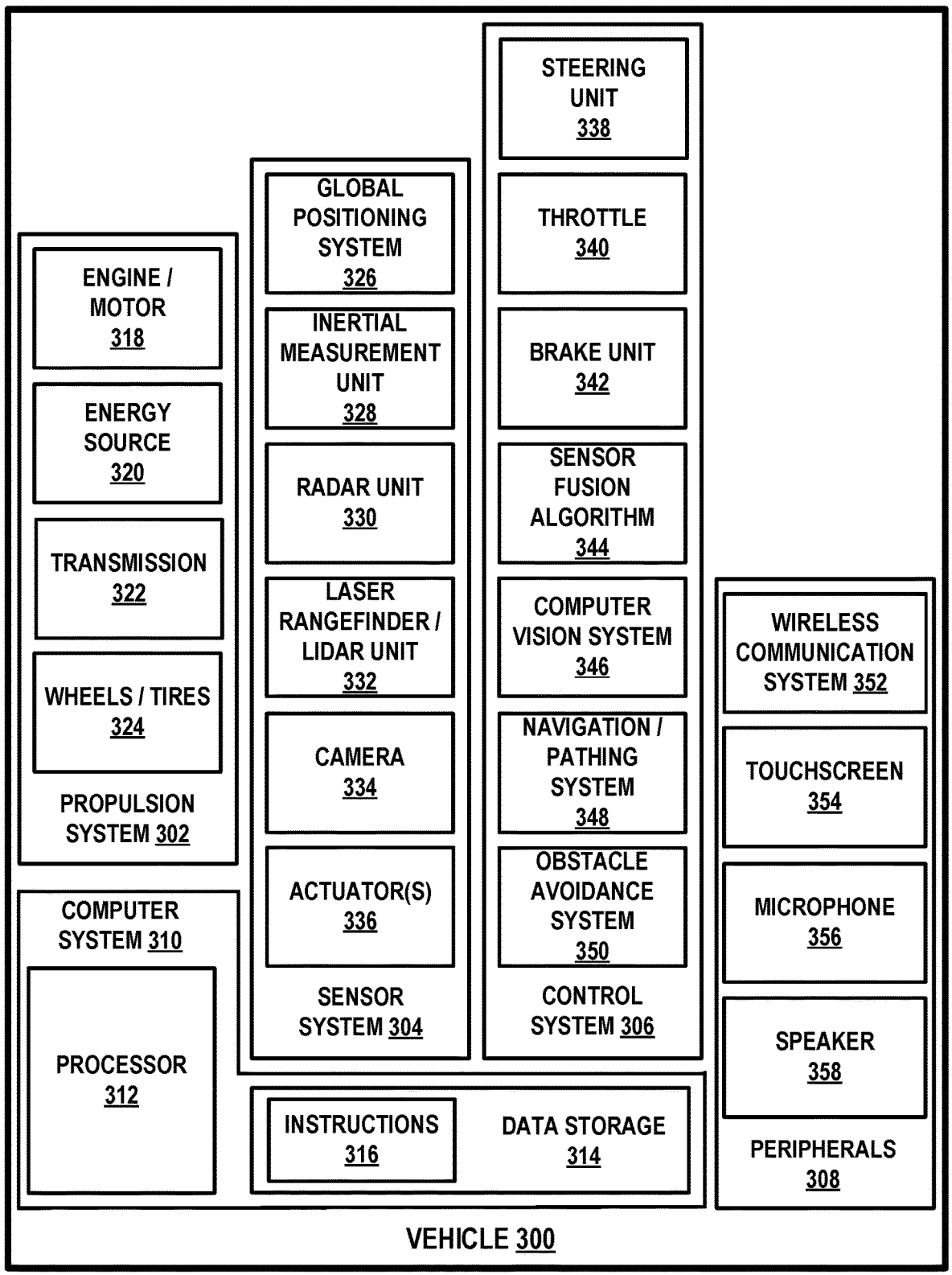
FIG. 3 is a simplified block diagram of a vehicle, according to an example embodiment.

FIG. 3 is a simplified block diagram of a vehicle 300, according to an example embodiment. As shown, the vehicle 300 includes a propulsion system 302, a sensor system 304, a control system 306, peripherals 308, and a computer system 310. In some embodiments, vehicle 300 may include more, fewer, or different systems, and each system may include more, fewer, or different components. Additionally, the systems and components shown may be combined or divided in any number of ways. For instance, control system 306 and computer system 310 may be combined into a single system.

Propulsion system 302 may be configured to provide powered motion for the vehicle 300. To that end, as shown, propulsion system 302 includes an engine/motor 318, an energy source 320, a transmission 322, and wheels/tires 324.

The engine/motor 318 may be or include any combination of an internal combustion engine, an electric motor, a steam engine, and a Sterling engine. Other motors and engines are possible as well. In some embodiments, propulsion system 302 may include multiple types of engines and/or motors. For instance, a gas-electric hybrid car may include a gasoline engine and an electric motor. Other examples are possible.

Energy source 320 may be a source of energy that powers the engine/motor 318 in full or in part. That is, engine/motor 318 may be configured to convert energy source 320 into mechanical energy. Examples of energy sources 320 include gasoline, diesel, propane, other compressed gas-based fuels, ethanol, solar panels, batteries, and other sources of electrical power. Energy source(s) 320 may additionally or alternatively include any combination of fuel tanks, batteries, capacitors, and/or flywheels. In some embodiments, energy source 320 may provide energy for other systems of the vehicle 300 as well. To that end, energy source 320 may additionally or alternatively include, for example, a rechargeable lithium-ion or lead-acid battery. In some embodiments, energy source 320 may include one or more banks of batteries configured to provide the electrical power to the various components of vehicle 300.

Transmission 322 may be configured to transmit mechanical power from the engine/motor 318 to the wheels/tires 324. To that end, transmission 322 may include a gearbox, clutch, differential, drive shafts, and/or other elements. In embodiments where the transmission 322 includes drive shafts, the drive shafts may include one or more axles that are configured to be coupled to the wheels/tires 324.

Wheels/tires 324 of vehicle 300 may be configured in various formats, including a unicycle, bicycle/motorcycle, tricycle, or car/truck four-wheel format. Other wheel/tire formats are possible as well, such as those including six or more wheels. In any case, wheels/tires 324 may be configured to rotate differentially with respect to other wheels/tires 324. In some embodiments, wheels/tires 324 may include at least one wheel that is fixedly attached to the transmission 322 and at least one tire coupled to a rim of the wheel that could make contact with the driving surface. Wheels/tires 324 may include any combination of metal and rubber, or combination of other materials. Propulsion system 302 may additionally or alternatively include components other than those shown.

Sensor system 304 may include a number of sensors configured to sense information about an environment in which the vehicle 300 is located, as well as one or more actuators 336 configured to modify a position and/or orientation of the sensors. As shown, sensor system 304 includes a Global Positioning System (GPS) 326, an inertial measurement unit (IMU) 328, a RADAR unit 330, a laser rangefinder and/or LIDAR unit 332, and a camera 334. Sensor system 304 may include additional sensors as well, including, for example, sensors that monitor internal systems of the vehicle 300 (e.g., an $O_2$ monitor, a fuel gauge, an engine oil temperature, etc.). Other sensors are possible as well.

GPS 326 may be any sensor (e.g., location sensor) configured to estimate a geographic location of vehicle 300. To this end, the GPS 326 may include a transceiver configured to estimate a position of the vehicle 300 with respect to the Earth. IMU 328 may be any combination of sensors configured to sense position and orientation changes of the vehicle 300 based on inertial acceleration. In some embodiments, the combination of sensors may include, for example, accelerometers, gyroscopes, etc. RADAR unit 330 may be any sensor configured to sense objects in the environment in which the vehicle 300 is located using radio signals. In some embodiments, in addition to sensing the objects, RADAR unit 330 may additionally be configured to sense the speed and/or heading of the objects. Similarly, laser range finder or LIDAR unit 332 may be any sensor configured to sense objects in the environment in which vehicle 300 is located using lasers. For example, LIDAR unit 332 may include one or more LIDAR devices, at least some of which may take the form of LIDAR devices 100 and/or 200 for instance. Camera 334 may be any camera (e.g., a still camera, a video camera, etc.) configured to capture images of the environment in which the vehicle 300 is located. To that end, camera 334 may take any of the forms described above.

Control system 306 may be configured to control one or more operations of vehicle 300 and/or components thereof. To that end, control system 306 may include a steering unit 338, a throttle 340, a brake unit 342, a sensor fusion algorithm 344, a computer vision system 346, navigation or pathing system 348, and an obstacle avoidance system 350.

Steering unit 338 may be any combination of mechanisms configured to adjust the heading of vehicle 300. Throttle 340 may be any combination of mechanisms configured to control engine/motor 318 and, in turn, the speed of vehicle 300. Brake unit 342 may be any combination of mechanisms configured to decelerate vehicle 300. For example, brake unit 342 may use friction to slow wheels/tires 324. As another example, brake unit 342 may convert kinetic energy of wheels/tires 324 to an electric current.

Sensor fusion algorithm 344 may be an algorithm (or a computer program product storing an algorithm) configured to accept data from sensor system 304 as an input. The data may include, for example, data representing information sensed by sensor system 304. Sensor fusion algorithm 344 may include, for example, a Kalman filter, a Bayesian network, an algorithm for some of the functions of the methods herein, or any another algorithm. Sensor fusion algorithm 344 may further be configured to provide various assessments based on the data from sensor system 304, including, for example, evaluations of individual objects and/or features in the environment in which vehicle 300 is located, evaluations of particular situations, and/or evaluations of possible impacts based on particular situations. Other assessments are possible as well.

Computer vision system 346 may be any system configured to process and analyze images captured by camera 334 in order to identify objects and/or features in the environment in which vehicle 300 is located, including, for example, traffic signals and obstacles. To that end, computer vision system 346 may use an object recognition algorithm, a Structure from Motion (SFM) algorithm, video tracking, or other computer vision techniques. In some embodiments, computer vision system 346 may additionally be configured to map the environment, track objects, estimate the speed of objects, etc.

Navigation and pathing system 348 may be any system configured to determine a driving path for vehicle 300. Navigation and pathing system 348 may additionally be configured to update a driving path of vehicle 300 dynamically while vehicle 300 is in operation. In some embodiments, navigation and pathing system 348 may be configured to incorporate data from sensor fusion algorithm 344, GPS 326, LIDAR unit 332, and/or one or more predetermined maps so as to determine a driving path for vehicle 300. Obstacle avoidance system 350 may be any system configured to identify, evaluate, and avoid or otherwise negotiate obstacles in the environment in which vehicle 300 is located. Control system 306 may additionally or alternatively include components other than those shown.

Peripherals 308 may be configured to allow vehicle 300 to interact with external sensors, other vehicles, external computing devices, and/or a user. To that end, peripherals 308 may include, for example, a wireless communication system 352, a touchscreen 354, a microphone 356, and/or a speaker 358.

Wireless communication system 352 may be any system configured to wirelessly couple to one or more other vehicles, sensors, or other entities, either directly or via a communication network. To that end, wireless communication system 352 may include an antenna and a chipset for communicating with the other vehicles, sensors, servers, or other entities either directly or via a communication network. The chipset or wireless communication system 352 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities.

Touchscreen 354 may be used by a user to input commands to vehicle 300. To that end, touchscreen 354 may be configured to sense at least one of a position and a movement of a user's finger via capacitive sensing, resistance sensing, or a surface acoustic wave process, among other possibilities. Touchscreen 354 may be capable of sensing finger movement in a direction parallel or planar to the touchscreen surface, in a direction normal to the touchscreen surface, or both, and may also be capable of sensing a level of pressure applied to the touchscreen surface. Touchscreen 354 may be formed of one or more translucent or transparent insulating layers and one or more translucent or transparent conducting layers. Touchscreen 354 may take other forms as well. Microphone 356 may be configured to receive audio (e.g., a voice command or other audio input) from a user of vehicle 300. Similarly, speakers 358 may be configured to output audio to the user.

Computer system 310 may be configured to transmit data to, receive data from, interact with, and/or control one or more of propulsion system 302, sensor system 304, control system 306, and peripherals 308. To this end, computer system 310 may be communicatively linked to one or more of propulsion system 302, sensor system 304, control system 306, and peripherals 308 by a system bus, network, and/or other connection mechanism (not shown).

In one example, computer system 310 may be configured to control operation of transmission 322 to improve fuel efficiency. As another example, computer system 310 may be configured to cause camera 334 to capture images of the environment. As yet another example, computer system 310 may be configured to store and execute instructions corresponding to sensor fusion algorithm 344. As still another example, computer system 310 may be configured to store and execute instructions for determining a 3D representation of the environment around vehicle 300 using LIDAR unit 332. Other examples are possible as well. Thus, for instance, computer system 310 could function as a controller for LIDAR unit 332.

As shown, computer system 310 includes processor 312 and data storage 314. Processor 312 may comprise one or more general-purpose processors and/or one or more special-purpose processors. To the extent that processor 312 includes more than one processor, such processors could work separately or in combination. Data storage 314, in turn, may comprise one or more volatile and/or one or more non-volatile storage components, such as optical, magnetic, and/or organic storage, and data storage 314 may be integrated in whole or in part with processor 312.

In some embodiments, data storage 314 may contain instructions 316 (e.g., program logic) executable by processor 312 to cause vehicle 300 and/or components thereof (e.g., LIDAR unit 332, etc.) to perform the various operations described herein. Data storage 314 may contain additional instructions as well, including instructions to transmit data to, receive data from, interact with, and/or control one or more of propulsion system 302, sensor system 304, control system 306, and/or peripherals 308.

In some embodiments, vehicle 300 may include one or more elements in addition to or instead of those shown. For example, vehicle 300 may include one or more additional interfaces and/or power supplies. Other additional components are possible as well. In such embodiments, data storage 314 may also include instructions executable by processor 312 to control and/or communicate with the additional components. Still further, while each of the components and systems are shown to be integrated in vehicle 300, in some embodiments, one or more components or systems may be removably mounted on or otherwise connected (mechanically or electrically) to vehicle 300 using wired or wireless connections. Vehicle 300 may take other forms as well.

Figure 4A:
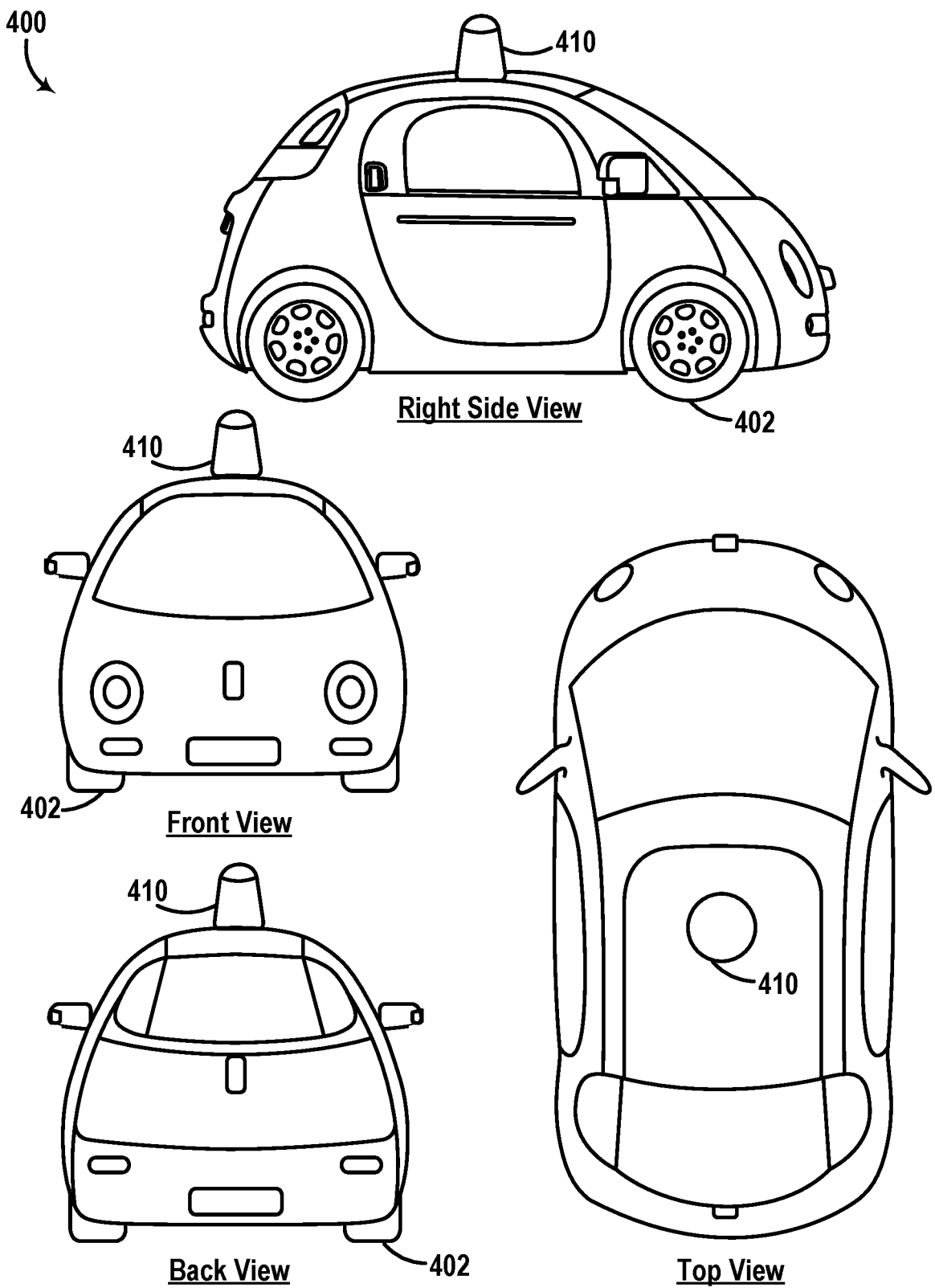
FIG. 4A illustrates several views of a vehicle equipped with a LIDAR device, according to an example embodiment.
Figure 4B:
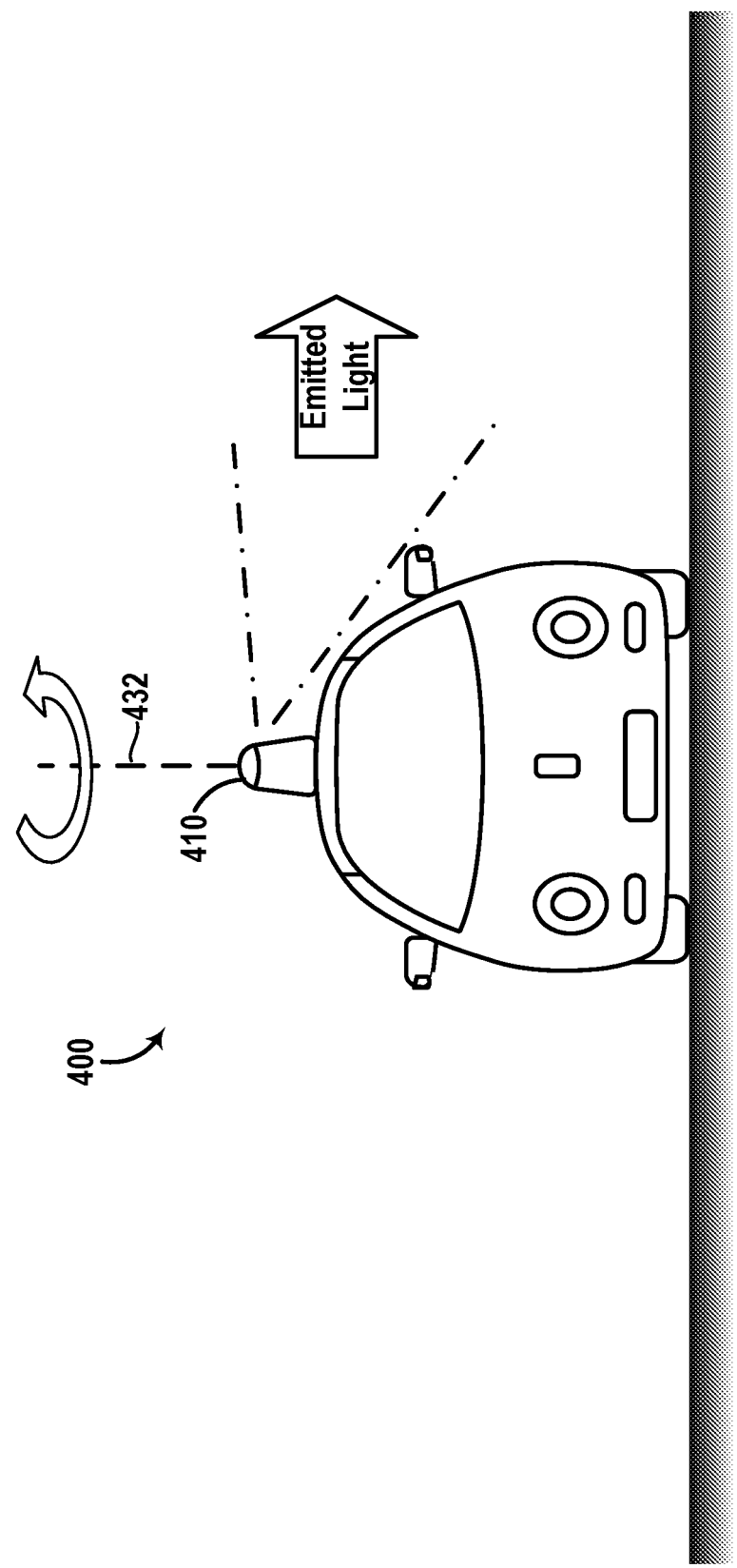
FIG. 4B illustrates an example operation of the LIDAR device.
Figure 4C:
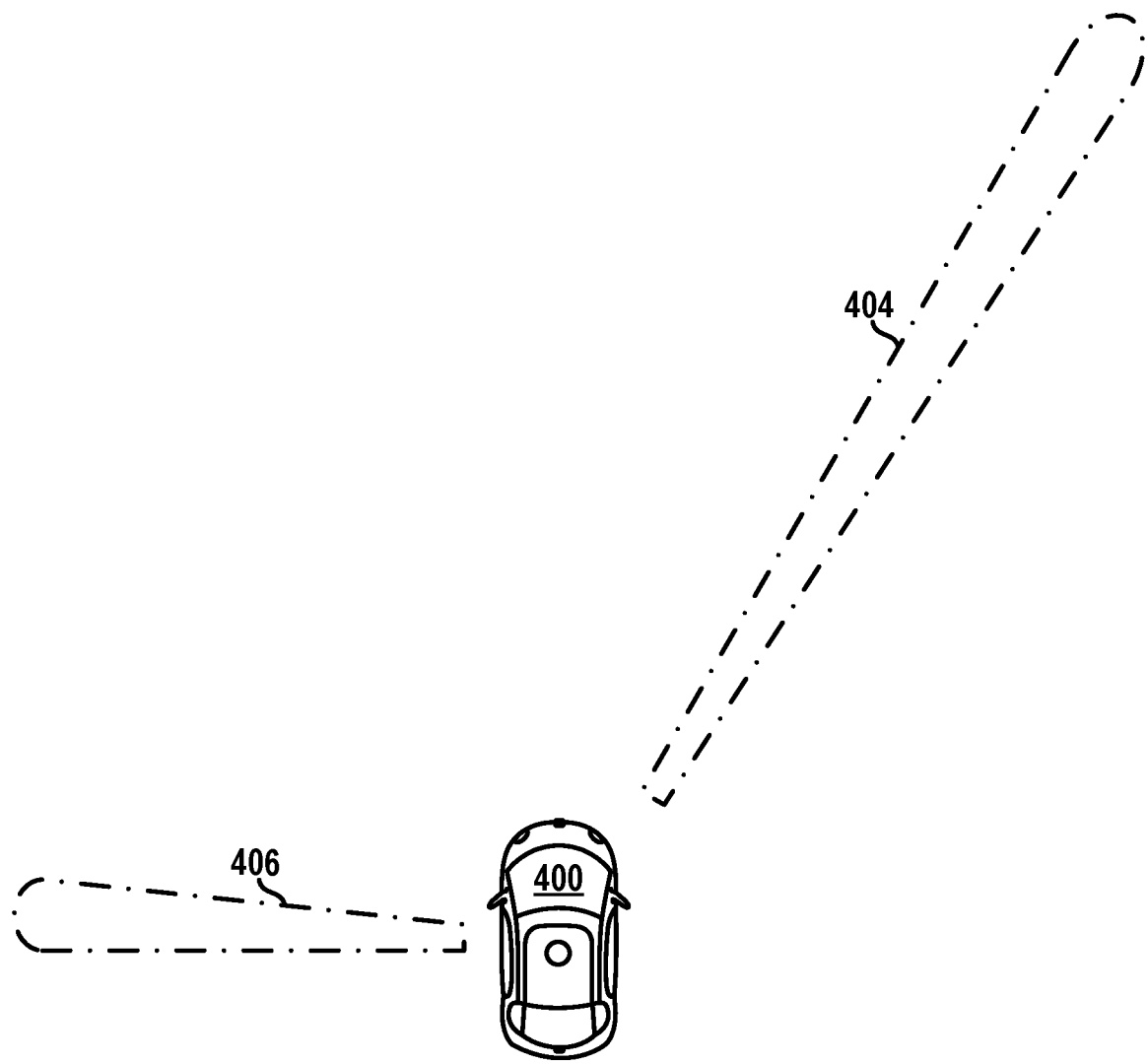
FIG. 4C illustrates example scanning ranges of the LIDAR device.

FIGS. 4A to 4C collectively illustrate a vehicle 400 equipped with a LIDAR device 410, according to example embodiments. Vehicle 400 may be similar to vehicle 300, for example. Although vehicle 400 is illustrated as a car, as noted above, other types of vehicles are possible. Furthermore, although vehicle 400 is shown as a vehicle that may be configured to operate in autonomous mode, the embodiments described herein are also applicable to vehicles that are not configured to operate autonomously.

FIG. 4A shows a Right Side View, Front View, Back View, and Top View of vehicle 400. As shown, vehicle 400 includes a LIDAR device 410 mounted on a top side of vehicle 400 opposite a bottom side on which wheels of vehicle 400, exemplified by wheel 402, are located. LIDAR device 410 may be similar to LIDAR devices 100 and/or 200, for example. Although LIDAR device 410 is shown and described as being positioned on a top side of vehicle 400, LIDAR device 410 could be alternatively positioned on any other part of vehicle 400, including any other side of vehicle 400 for instance.

FIG. 4B next shows that LIDAR device 400 may be configured to scan an environment around vehicle 400 by rotating about vertical axis 432, which may be similar to axis 232 for instance, while emitting one or more light pulses and detecting reflected light pulses off objects in an environment of vehicle 400, for example.

Thus, as shown, LIDAR device 410 may emit light in a pointing direction of LIDAR 410, which is shown in FIG. 4B as a pointing direction toward a right side of the page for example. With this arrangement, LIDAR device 410 can emit light toward regions of the environment that are relatively close to the vehicle (e.g., a lane marker) as well as toward regions of the environment that are further away from the vehicle (e.g., a road sign ahead of the vehicle). Further, vehicle 400 can rotate LIDAR device 410 (or one or more components thereof) about axis 432 to change the pointing direction of LIDAR device 410. Thus, for each complete rotation of LIDAR device 410 (or one or more components thereof), LIDAR device 410 can scan a 360° FOV around vehicle 400.

FIG. 4C illustrates vehicle 400 the scanning range of LIDAR device 410 at two different pointing directions of LIDAR device 410, according to an example embodiment. In line with the discussion above, example implementations herein may involve dynamically controlling various scanning parameters of LIDAR device 410 (e.g., scanning resolution, scanning range, scanning refresh rate, etc.) for a given pointing direction of LIDAR device 410. For example, in a first pointing direction, LIDAR device 410 can be configured to emit light pulses having a relatively high light intensity. As a result, the emitted light pulses may reflect from distant objects (i.e., high scanning range) and reflect back to LIDAR device 410 with a sufficiently high intensity to be detected by LIDAR device 410, thereby allowing LIDAR device 410 to detect the distant objects. This is illustrated in FIG. 4C by contour 404. For example, objects inside of contour 404 may be within a range of distances suitable for proper detection/identification.

As another example, when LIDAR device 410 is rotated to a second pointing direction, LIDAR device 410 can be configured to emit light pulses having a relatively lower light intensity, which may result in reflections off the distant objects being less detectable, thereby effectively reducing the scanning range of LIDAR device 410. This is illustrated in FIG. 4C by contour 406. As shown, contour 406 may extend a shorter distance from vehicle 400, and may thus define a region of the environment where objects are at a suitable range of distances for proper detection/identification using the lower intensity light pulses emitted in the second pointing direction. It is noted that these contours are not to scale but are illustrated as shown for convenience of description.

Although not shown, other types of modulation schemes for the emitted light pulses are also possible. For example, to apply a different respective refresh rate of LIDAR device 410, in the first pointing direction (i.e., contour 404) relative to the second pointing direction (i.e., contour 406), LIDAR device 410 can emit one light pulse in the first pointing direction for every complete rotation of LIDAR device 410 about axis 432, and for every two complete rotations of LIDAR device 410 about axis 432. By doing so, for instance, the first pointing direction can be assigned a higher refresh rate than the second pointing direction. As another example, to apply a different respective horizontal scanning resolution, LIDAR device 410 can be configured to emit light pulses at a different pulse rate (e.g., number of pulses per second) when LIDAR device 410 is oriented in the first pointing direction than a pulse rate applied when LIDAR device 410 is oriented in the second pointing direction.

IV. EXAMPLE METHODS

Figure 5:
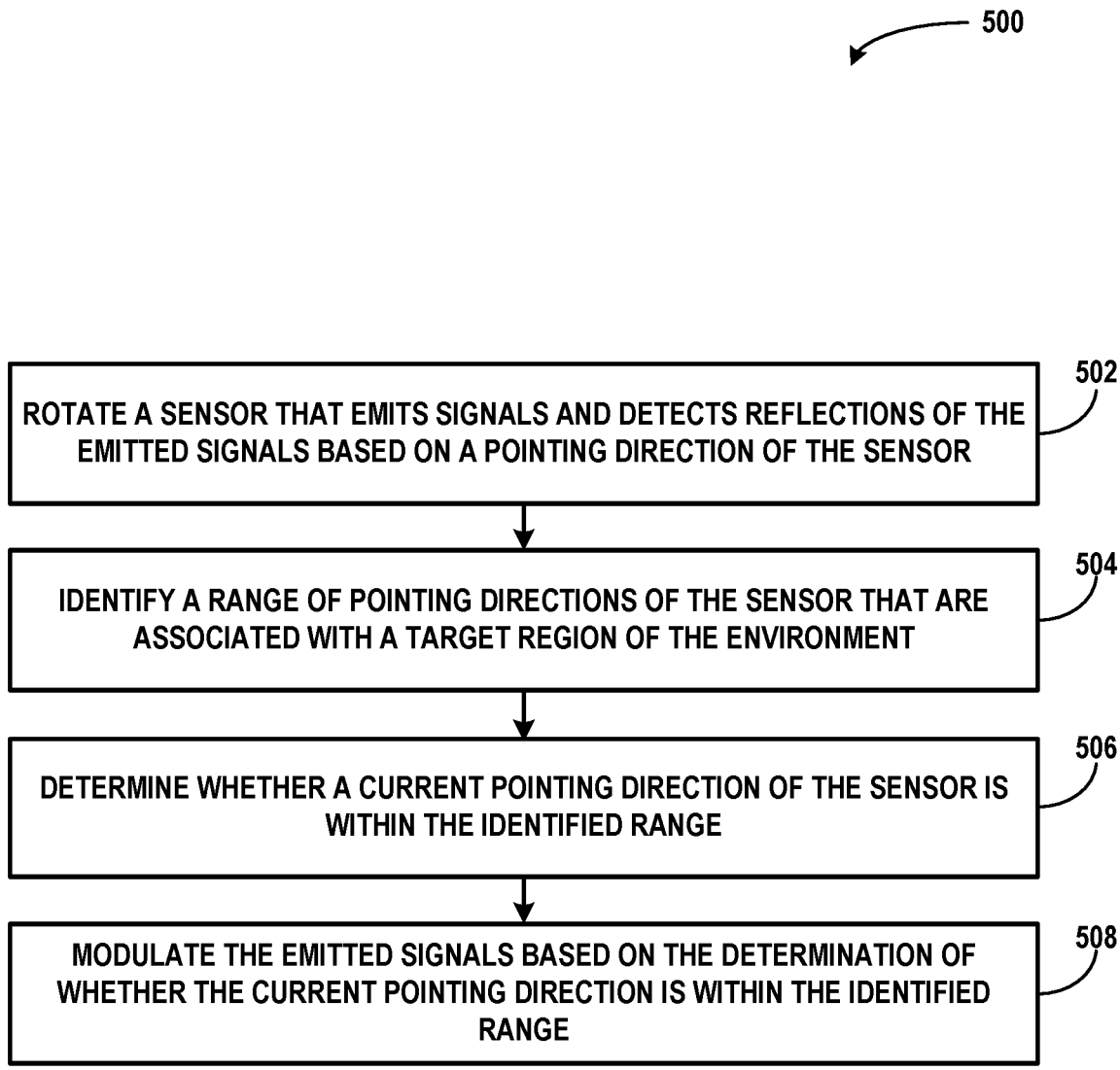
FIG. 5 is a flowchart of a method, according to an example embodiment.

FIG. 5 is a flowchart of a method 500, according to example embodiments. Method 500 presents an embodiment of a method that could be used with any of LIDAR devices 100, 200, 410, and/or vehicles 300, 400, for example. Method 500 may include one or more operations, functions, or actions as illustrated by one or more of blocks 502-508. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation. In addition, for method 500 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for method 500 and other processes and methods disclosed herein, each block in FIG. 5 may represent circuitry that is wired to perform the specific logical functions in the process.

Thus, in various examples, the functions of method 500 can be implemented using controller 104, computer system 310, and/or control system 306. Further, in some examples, the various functions of method 500 can be implemented by a combination of one or more of these components. For example, the various functions of method 500 can be distributed between controller 104 and computer system, among other possibilities.

At block 502, method 500 involves rotating a sensor that emits signals and detects reflections of the emitted signals based on a pointing direction of the sensor. Rotating the sensor, for example, may change the pointing direction of the sensor such that the sensor scans a region of an environment from which the emitted signals are reflected. Referring back to FIGS. 4B and 4C for example, LIDAR device 410 (i.e., "sensor") can emit light pulses (i.e., "signal") toward a surrounding environment at a first pointing direction to scan a region of the environment indicated by contour 404, and then rotated to a second pointing direction to a scan a different region of the environment indicated by contour 406.

However, in some examples, method 500 may involve using a different type of sensor (e.g., RADAR unit 332, camera 334, SONAR sensor, etc.), and may thus emit and/or detect a different type of signal (e.g., radio waves, sound waves, etc.).

At block 504, method 500 involves identifying a range of pointing directions of the sensor that are associated with a target region of the environment. In a first example, where the sensor is mounted to a vehicle, the target region may be a location within or adjacent to a road where the vehicle is travelling. In a second example, the target region may correspond to a region where a system of method 500 decides to track a particular object (e.g., pedestrian, animal, object on an assembly line, etc.). In a third example, the target region may correspond to a region that a system of method 500 decides to monitor for presence of objects. Other examples are possible as well. To that end, the identification at block 504 may involve identifying the range of pointing directions of the sensor where a FOV of the sensor (e.g., contour 404, 406, etc.) overlaps a location of the target region.

In some implementations, method 500 may also involve obtaining a scan of the environment (or a region thereof) using another sensor, and identifying the target region of the environment based at least in part on the scan obtained using the other sensor. In a first example, the other sensor may be an active range sensor, such as RADAR unit 330 or a SONAR sensor, among others. In a second example, the other sensor may be a passive sensor, such as camera 334, microphone 356, etc. Further, in some instances, the other sensor may be included in a same system (e.g., vehicle 300, 400, etc.) that also includes the sensor. Alternatively, in other instances, the other sensor may be included in a different system (e.g., street camera, another vehicle, wireless sensor network, etc.) that is communicatively coupled with a system (e.g., vehicle 300, 400, etc.) that includes the sensor (e.g., LIDAR device 100, 200, 410, etc.) of block 502.

In other implementations, method 500 may alternatively involve identifying the target region of the environment based on a previous scan of the environment obtained using the (same) sensor. By way of example, vehicle 400 may rotate LIDAR device 410 (or components thereof) repeatedly for 360° rotations about axis 432. When LIDAR device 410 is at a particular pointing direction that corresponds to contour 404, vehicle 400 may detect an unidentified object in the scan of the environment (e.g., via obstacle avoidance system 350, etc.). The unidentified object may be, for instance, harmless debris or may be a small vehicle (e.g., motorcycle, etc.) that is relevant to navigation of vehicle 400. Thus, at a subsequent or later rotation of LIDAR device 410, vehicle 400 may decide to increase the scanning range (e.g., light intensity of emitted light pulses) and/or the scanning resolution (e.g., pulse rate of emitted light pulses) when LIDAR device 410 returns to or near the particular pointing direction, thereby allowing vehicle 400 to determine a more detailed map for the target region that includes the unidentified object.

Further, in some implementations, method 500 may also involve determining a navigation path associated with a vehicle that mounts the sensor, and identifying the target region of the environment based on the navigation path. In a first example, the vehicle may operate in an autonomous mode and may thus include a navigation system (e.g., navigation/pathing system 348) that steers the vehicle toward a particular destination. In this example, the determined navigation path may indicate a planned vehicle maneuver (e.g., left turn, right turn, lane change, etc.). Thus, a system of method 500 may select or otherwise identify the target region as a region along an expected navigation path of the vehicle (e.g., to monitor incoming vehicles along a street lane in which the vehicle expects to merge, etc.).

Further, in some implementations, method 500 may also involve obtaining a speed measurement (e.g., via GPS 326, IMU 328, RADAR unit 330, etc.), and identifying the target region of the environment based on the speed measurement. By way of example, where the sensor is mounted to a vehicle, the vehicle may determine the target region as a region of the environment in front or behind the vehicle and to an extent that depends on the speed of the vehicle. For instance, if the vehicle is travelling at a relatively high speed, then the vehicle may decide to increase the scanning range (i.e., scanned distance from the vehicle) in front of the vehicle to detect objects (e.g., other vehicles, etc.) at a sufficiently large distance from the vehicle. By doing so, the vehicle may have enough time to apply brakes (e.g., brake unit 342), if necessary, to reduce the speed of the vehicle or otherwise from the high speed, thereby reducing the likelihood of a collision. Whereas, in this instance, the vehicle can decide to reduce the scanning range in a backward pointing direction of the vehicle due to a lower likelihood that an object behind the vehicle may approach the vehicle at this high speed.

At block 506, method 500 involves determining whether a current pointing direction of the sensor is within the identified range. In a first example, the determination at block 506 can be based at least in part on a previous scan of the environment by the sensor. For instance, as the sensor is rotate according to block 502, a system of method 500 can keep track of the pointing directions associated with detected reflections of the emitted signal. As such, if a region of interest is selected for scanning with different scanning parameters, then the previously tracked pointing directions associated with the region of interest can be included in the identified range of pointing directions. In turn, when the sensor rotates back to the same or adjacent pointing directions, the system can determine that the current pointing direction is within the identified range. In a second example, the determination at block 506 may be based on output from another sensor (e.g., RADAR unit 330, camera 334, microphone 356, etc.) that indicates the target region (e.g., where a fast moving object may be present, etc.). In a third example, the determination at block 506 may be based on other factors, such as data received from an external system (e.g., accident reporting server, street camera, etc.), a determination by navigation/pathing system 348, etc.

At block 508, method 500 involves modulating the emitted signal based on the determination of block 506. More specifically, method 500 may involve modulating the emitted signal according to a first modulation scheme in response to a determination that the current pointing direction is within the identified range, and modulating the emitted signal according to a second (different) modulation scheme in response to a determination that the current pointing direction is outside the identified range.

For example, where the sensor is mounted to a vehicle, the target region may include regions of the environment along or adjacent to a road in which the vehicle is travelling. Thus, for instance, the vehicle may select the first modulation scheme to provide a relatively high scanning range (e.g., high light intensity of emitted light pulses, etc.), a relatively high (horizontal) scanning resolution (e.g., high pulse rate, etc.), and/or a relatively high refresh rate (e.g., one or few number of complete rotations between consecutive emissions of light pulses at the current pointing direction). Whereas, for instance, if the current pointing direction is outside the identified range (e.g., a distant region from the road), then the vehicle may select relatively lower scanning parameters (e.g., lower scanning range, etc.) that are more suitable for scanning the less critical regions of the environment.

Thus, in some implementations, the first modulation scheme (assigned for scanning the target region) may relate to a target scanning resolution. As such, modulating the emitted signal according to the first modulation scheme may thus involve emitting the signal (e.g., light pulses) at a pulse rate that achieves the target scanning resolution. For example, a relatively high pulse rate can be employed to achieve a higher (horizontal) scanning resolution by increasing the number of pulses emitted over a similar amount of time as that in which another region in scanned using a relatively lower pulse rate.

Additionally or alternatively, in some implementations, the first modulation scheme may relate to a target scanning range for scanning the target region. The target scanning range, for example, may relate to a distance between the sensor and the target region. As such, modulating the emitted signals according to the first modulation scheme may involve emitting the signal with an amount of energy that achieves the target scanning range. For example, a relatively strong signal (e.g., high intensity light pulse) can be used to scan distant regions of the environment, as opposed to a relatively weaker signal (e.g., lower intensity light pulse) that can be used to scan closer regions of the environment.

Additionally or alternatively, in some implementations, the first modulation scheme may relate to a target scanning refresh rate for scanning the target region. As such, modulating the emitted signals according to the first modulation scheme may involve determining, based on the target scanning refresh rate, a number of complete rotations of the sensor between consecutive emissions of signals at a particular pointing direction within the identified range. For instance, if LIDAR device 410 rotates at a rate of 15 Hz, then LIDAR device 410 may emit a respective light pulse at the particular pointing direction for every five complete rotations of LIDAR device 410 to achieve a target scanning refresh rate of 3 Hz for the region of the environment scanned at the particular pointing direction.

In some implementations, method 500 may also involve obtaining an indication of a temperature measurement associated with the emitted light pulses, and modifying at least one of the first modulation scheme or the second modulation scheme to reduce the temperature measurement. For example, temperature sensor 110 can be used to measure a temperature of optical element(s) 108 (e.g., lens, mirror, etc.) along a propagation path of the emitted signal. The optical element may become damaged if subjected to frequent high intensity light pulses for instance. Thus, even if the first modulation scheme was selected for scanning the target region (e.g., via navigation/pathing system 348, etc.) to use a high refresh rate or scanning range, a system of method 500 may reduce the selected scanning refresh rate if the measured temperature approaches a threshold. As another example, the temperature measurement may relate to a temperature of another component (e.g., heat sink 112, other electronics, etc.) of the LIDAR device that may be affected by heat energy associated with emitting the signals by the sensor.

In some implementations, method 500 may also involve monitoring an amount of energy provided to the sensor for emitting the signals at block 502, and modifying at least one of the first modulation scheme or the second modulation scheme such that the amount of energy provided during a predetermined time window remains within a predefined range. In a first example, where the emitted signals are light pulses generated by a laser, the predetermined time window and the predefined range may be safety thresholds for emitting high intensity laser beams toward a particular direction. Thus, if the determined amount of energy needed to achieve a target scanning range, resolution, and refresh rate would cause emission of laser beams outside the safety thresholds, then an example system can automatically or otherwise adjust the selected scanning parameters (i.e., modulation scheme) according to the safety thresholds. In a second example, the predefined range may relate to design characteristics of a fiber laser. For instance, the fiber laser may use a certain amount of energy over the predetermined time window to amplify the emitted light pulses at a predictable (e.g., linear) rate of amplification. Alternatively or additionally, the predefined range may indicate a maximum predefined threshold at which the LIDAR device (and/or fiber laser) may generate excessive heat that may affect other components of the LIDAR device. Other factors are possible as well.

V. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed:

1. A method comprising:
   changing a pointing direction of a light detection and ranging (LIDAR) device, wherein the LIDAR device emits light pulses and detects reflections of the emitted light pulses based on a pointing direction of the LIDAR device, wherein the pointing direction of the LIDAR device changes such that the LIDAR device scans a region of an environment from which the emitted light pulses are reflected;
   identifying a range of pointing directions of the LIDAR device that are associated with a target region of the environment;
   determining whether a current pointing direction of the LIDAR device is within the identified range of pointing directions;
   in response to a determination that the current pointing direction is within the identified range of pointing directions, modulating the emitted light pulses according to a first modulation scheme, wherein modulating the emitted light pulses according to the first modulation scheme comprises emitting the light pulses with a first intensity; and
   in response to a determination that the current pointing direction is outside the identified range of pointing directions, modulating the emitted light pulses according to a second modulation scheme, wherein the second modulation scheme is different than the first modulation scheme, wherein modulating the emitted light pulses according to the second modulation scheme comprises emitting the light pulses with a second intensity that is lower than the first intensity.

2. The method of claim 1, wherein the first modulation scheme relates to a target scanning resolution for scanning the target region, and
   wherein modulating the emitted light pulses according to the first modulation scheme comprises emitting the light pulses at a pulse rate that achieves the target scanning resolution.

3. The method of claim 1, wherein the first modulation scheme relates to a target scanning range for scanning the target region,
   wherein the target scanning range is related to a distance between the LIDAR device and the target region, and
   wherein modulating the emitted light pulses according to the first modulation scheme comprises emitting the light pulses with an amount of energy that achieves the target scanning range.

4. The method of claim 1, wherein the first modulation scheme relates to a target scanning refresh rate for scanning the target region, and
   wherein modulating the emitted light pulses according to the first modulation scheme comprises determining, based on the target scanning refresh rate, a number of complete rotations of the LIDAR device between consecutive emissions of light pulses at a particular pointing direction within the identified range.

5. The method of claim 1, further comprising:
   obtaining, via a temperature sensor, an indication of a temperature measurement associated with the emitted light pulses; and
   modifying at least one of the first modulation scheme or the second modulation scheme to reduce the temperature measurement indicated by the temperature sensor.

6. The method of claim 1, further comprising:
   monitoring an amount of energy provided to the LIDAR device for emitting the light pulses; and
   modifying at least one of the first modulation scheme or the second modulation scheme such that the amount of energy provided during a predetermined time window remains within a predefined range.

7. The method of claim 1, further comprising:
   obtaining a speed measurement indicative of a speed of the LIDAR device in the environment; and
   identifying the target region of the environment based on at least the speed measurement.

8. The method of claim 1, further comprising:
   determining a navigation path associated with a vehicle, wherein the LIDAR device is mounted to the vehicle; and
   identifying the target region of the environment based on at least the navigation path.

9. The method of claim 1, further comprising:
   obtaining, via an additional sensor, a scan of at least one region of the environment; and
   identifying the target region of the environment based on at least the scan obtained via the additional sensor.

10. The method of claim 1, further comprising identifying the target region of the environment based on a previous scan of the environment obtained using the LIDAR device.

11. A vehicle comprising:
    a LIDAR device that emits light pulses and detects reflections of the emitted light pulses based on a pointing direction of the LIDAR device, wherein the pointing direction of the LIDAR device changes such that the LIDAR device scans a region of an environment from which the light pulses are reflected;
    one or more processors; and
    data storage storing instructions that, when executed by the one or more processors, cause the vehicle to perform operations comprising:
       identifying a range of pointing directions of the LIDAR device that are associated with a target region of the environment;
       determining whether a current pointing direction of the LIDAR device is within the identified range of pointing directions;
       in response to a determination that the current pointing direction is within the identified range of pointing directions, modulating the emitted light pulses according to a first modulation scheme, wherein modulating the emitted light pulses according to the first modulation scheme comprises emitting the light pulses with a first intensity; and
       in response to a determination that the current pointing direction is outside the identified range of pointing directions, modulating the emitted light pulses according to a second modulation scheme different than the first modulation scheme, wherein modulating the emitted light pulses according to the second modulation scheme comprises emitting the light pulses with a second intensity that is lower than the first intensity.

12. The vehicle of claim 11, further comprising an additional sensor that provides a speed measurement indicative of a speed of the vehicle,
wherein the operations further comprise identifying the target region of the environment based on at least the speed measurement.

13. The vehicle of claim 11, wherein the operations further comprise:
determining a navigation path associated with the vehicle; and
identifying the target region of the environment based on at least the navigation path.

14. The vehicle of claim 13, wherein the vehicle is an autonomous vehicle, and wherein the determined navigation path comprises an expected navigation path of the autonomous vehicle.

15. The vehicle of claim 11, further comprising an additional sensor that scans at least one region of the environment,
wherein the operations further comprise identifying the target region of the environment based on at least the scan obtained via the additional sensor.

16. The vehicle of claim 11, wherein the first modulation scheme relates to a target scanning refresh rate for scanning the target region, and
wherein modulating the emitted light pulses according to the first modulation scheme comprises determining, based on the target scanning refresh rate, a number of complete rotations of the LIDAR device between consecutive emissions of light pulses at a particular pointing direction within the identified range.

17. A light detection and ranging (LIDAR) device that changes a pointing direction of the LIDAR device, the LIDAR device comprising:
a LIDAR transmitter that emits light pulses in the pointing direction of the LIDAR device;
a LIDAR receiver that receives reflections of the emitted light pulses such that the LIDAR device scans a region of an environment from which the emitted light pulses are reflected; and
a controller that: (i) receives an indication of a range of pointing directions of the LIDAR device that are associated with a target region of the environment, (ii) determines whether a current pointing direction of the LIDAR device is within the range of pointing directions, (iii) modulates the emitted light pulses according to a first modulation scheme in response to a determination that the current pointing direction is within the range of pointing directions, and (iv) modulates the emitted light pulses according to a second modulation scheme in response to a determination that the current pointing direction is outside the range of pointing directions,
wherein the second modulation scheme is different than the first modulation scheme, wherein modulating the emitted light pulses according to the first modulation scheme comprises emitting the light pulses with a first intensity and modulating the emitted light pulses according to the second modulation scheme comprises emitting the light pulses with a second intensity that is lower than the first intensity.

18. The LIDAR device of claim 17, further comprising a temperature sensor that provides an indication of a temperature measurement associated with the emitted light pulses,
wherein the controller also modifies at least one of the first modulation scheme or the second modulation scheme to reduce the temperature measurement indicated by the temperature sensor.

19. The LIDAR device of claim 18, further comprising an optical element arranged along a propagation path of the emitted light pulses, wherein the temperature measurement is indicative of a temperature of the optical element.

20. The LIDAR device of claim 18, further comprising a heat sink coupled to the LIDAR transmitter, wherein the temperature measurement is indicative of a temperature of the heat sink.

* * * * *